United States Patent [19]

Krutzel

[11] Patent Number: 5,391,434

[45] Date of Patent: Feb. 21, 1995

[54] HOT MELT ADHESIVE COMPOSITIONS COMPRISING LOW MOLECULAR WEIGHT ETHYLENE COPOLYMERS

[75] Inventor: Lawrence Krutzel, Morristown, N.J.

[73] Assignee: AlliedSignal Inc., Morris Township, Morris County, N.J.

[21] Appl. No.: 241,539

[22] Filed: May 12, 1994

Related U.S. Application Data

[60] Division of Ser. No. 131,921, Oct. 4, 1993, Pat. No. 5,340,863, which is a continuation of Ser. No. 850,647, Mar. 13, 1992, abandoned.

[51] Int. Cl.$^6$ .............. B32B 27/36; B32B 15/08; B32B 27/06; B32B 27/08
[52] U.S. Cl. .................. 428/412; 428/463; 428/483; 428/516; 428/518; 428/520
[58] Field of Search ............... 428/412, 463, 483, 516, 428/518, 520

[56] References Cited

U.S. PATENT DOCUMENTS

| | | | |
|---|---|---|---|
| 3,997,489 | 12/1976 | Coker | 260/28.5 |
| 4,076,911 | 2/1978 | Fenton | 526/11.1 |
| 4,293,473 | 10/1981 | Eastman | 260/27 |
| 4,601,948 | 6/1986 | Lancaster et al. | 428/349 |
| 4,871,618 | 10/1989 | Kinneberg et al. | 428/461 |
| 4,880,904 | 11/1989 | Kinneberg et al. | 528/392 |
| 5,037,874 | 8/1991 | Nuttens et al. | 524/275 |

FOREIGN PATENT DOCUMENTS

| | | |
|---|---|---|
| 149256 | 6/1991 | Japan . |
| 3181557 | 7/1991 | Japan . |
| 181557 | 8/1991 | Japan . |
| WO91/18043 | 11/1991 | WIPO . |

OTHER PUBLICATIONS

Research Disclosure; Oct. 1975 p. 8.
Ethylene Copolymer For Adhesion To Plastics; E. McBride DuPont Company; pp. 199–211.
A-C Performance Additives For Recyclable Adhesives & Coatings.

*Primary Examiner*—Paul R. Michl
*Assistant Examiner*—Peter Szekely
*Attorney, Agent, or Firm*—Melanie L. Brown; Roger H. Criss

[57] ABSTRACT

Hot melt adhesive compositions which include a base polymer constituent, a tackifying constituent, a wax constituent, and which further includes a low molecular weight polyethylene copolymer constituent which includes ketone functional moieties and/or hydroxyl functional moieties wherein the hot melt adhesive composition may be further characterized as providing improved adhesive strength to polar and non-polar substrates.

31 Claims, No Drawings

HOT MELT ADHESIVE COMPOSITIONS COMPRISING LOW MOLECULAR WEIGHT ETHYLENE COPOLYMERS

This application is a divisional of application Ser. No. 131,921, filed Oct. 4, 1993, now U.S. Pat. No. 5,340,863, which is a continuation of application Ser. No. 850,647, filed Mar. 13, 1992, abandoned.

BACKGROUND

1. Field of the Invention

The present invention is related to hot melt adhesive compositions; more particularly the present invention application is directed to improvements in hot melt adhesive compositions comprising low molecular weight ethylene copolymers having improved adhesive properties to a variety of substrate materials of both polar and non-polar characteristics.

2. Description of the Prior Art

As is known to the art, conventional hot melt adhesive compositions typically comprise three primary constituents; a base polymer which provides adhesion and toughness to the adhesive in its cooled state, a waxy material which acts to initiate the setting and solidification of the heated adhesive composition and to further minimize the viscosity, and a tackifying constituent which enhances the wetting and adhesion of the composition to the surfaces upon which it is applied. Ideally, a hot melt adhesive composition is useful for bonding a wide variety of substrates, including polar substrates such as metals, polycarbonates, polyesters including polyethylene terephthalate ("PET"), as well as halogenated polymer compositions, including PVC, and further, nonpolar substrates such as polyolefins, including polyethylene and polypropylene. Further, such hot melt adhesive compositions exhibit good compatibility of their individual constituents. The prior art proposes various solutions to these problems.

U.S. Pat. No. 5,037,874 to Nuttens et al. describes a compatible wax which comprises a synthetic polyethylene wax which includes incorporated carbon monoxide ("CO") terminal groups and a method for its production. The advantages cited by the reference include a novel process for the production of the synthetic polyethylene wax, and its compatibility with conventional hot melt adhesive compositions.

U.S. Pat. No. 4,601,948 to Lancaster provides adhesive compositions which are used in bonding materials utilizing high frequency radiation; the adhesives therein include ethylene/carbon monoxide copolymers and terpolymers which are cited as having melt indices of 0.5–2500, which are expected to be relatively higher weight materials.

U.S. Pat. Nos. 4,880,904 and 4,871,618 to Kinneberg provide adhesive compositions and laminated structures which consist essentially of a linear alternating polymer which is heat curable, and which is preferably of a number average molecular weight of the range of 10,000 to 30,000.

A paper entitled "Ethylene Copolymer for Adhesion to Plastics" by E. McBride and presented at an Adhesive and Sealant Council Seminar on Apr. 16, 1991 describes hot melt adhesive systems which include as the base polymer constituent various high molecular weight copolymers and terpolymers, including ethylene/carbon monoxide "E/CO", ethylene/vinyl acetate/carbon monoxide "E/VA/CO", and ethylene/acrylate/carbon monoxide "E/Ac/CO". The paper cites the need for improved waxes which exhibit compatibility with the aforementioned base polymers.

Japanese Kokai 181557 of 1991, describes compositions which are similar to those described in the McBride paper above.

While these and other prior art references provide useful hot melt adhesive compositions, there remains a continuing need for improved hot melt adhesive compositions featuring improved adhesive strength characteristics for both polar and non-polar type substrates.

SUMMARY

The present invention provides a hot melt adhesive composition which includes a base polymer constituent, a tackifying constituent, a wax constituent, and which further includes a low molecular weight polyethylene copolymer constituent which includes ketone functional moieties and/or hydroxyl functional moieties wherein the hot melt adhesive composition may be further characterized as providing improved adhesive strength to polar and non-polar substrates. Optionally, the hot melt adhesive composition further includes minor amounts of one or more conventional additives, such as thermal stabilizing constituents and anti-oxidants.

In a further aspect of the present invention there is provided a process for improving the adhesive strength of conventional hot melt adhesive composition which includes a base polymer constituent, a tackifying constituent, and a wax constituent, the process improvement comprising the addition of an effective amount of a low molecular weight polyethylene copolymer constituent which includes ketone functional moieties and/or hydroxyl functional moieties.

In a still further aspect of the invention there are provided laminar constructions which comprise two substrate materials having a layer of the improved adhesive taught herein disposed between and interfacially contacting each of the substrate layers.

These and other aspects of the invention will be more apparent from the following detailed description of the invention.

DETAILED DESCRIPTION OF THE PREFERRED EMBODIMENTS

The present invention provides hot melt adhesive compositions which feature improved adhesive strength to both polar and non-polar substrates which composition includes a conventionally used base polymer constituent, a conventional tackifying constituent, a wax constituent, and a low molecular weight polyethylene copolymer constituent which includes ketone functional moieties and/or hydroxyl functional moieties. The wax constituent described may be partially or completely substituted by the low molecular weight polyethylene copolymer constituent described above. Optionally, effective are conventional additives, such as thermal and/or oxidative stabilizers may be incorporated into the hot melt adhesive compositions of the present invention.

It is to be understood that the term "copolymer" as used throughout this description of the invention is to be understood to define a constituent comprised essentially of two monomeric constituents, as well as constituents comprised essentially of three monomeric constituents, sometimes interchangeably referred to as "terpolymers", as well as constituents comprised essentially of four or more monomeric constituents.

Conventional base polymer constituents may be one or more base polymers which are known to the art as useful in hot melt adhesive compositions. Preferred base polymers include ethylene copolymers including ethylene/carbon monoxide "E/CO", ethylene/vinyl acetate/carbon monoxide "E/VA/CO", ethylene/vinyl acetate "E/VA", ethylene/acrylate/carbon monoxide "E/Ac/CO", and ethyl/acrylate "E/Ac". The acrylate portions of the E/Ac/CO or E/Ac copolymers may be methyl acrylate, ethyl acrylate, n-butyl acrylate, as well as 2-ethylhexylacrylate. The base polymer constituents include characteristic properties including a melt index of 0.2–3000 dg/min according to ASTM D-1238. These ethylene copolymers may comprise varying weight proportions of the monomers from which they are produced. By way of example, the E/VA copolymer may comprise between 0.1–99.9% by ,weight of ethylene, and 99.9–0.1% by weight of vinyl acetate. Similarly, the E/CO may comprise between 0.1–99.9% by weight of ethylene, and 99.9–0.1% by weight of carbon monoxide. For terpolymers, (i.e., copolymers comprising three or more constituents) the weight percentages of the individual monomers may be in any percentage, such as in the case of E/Ac/CO the weight percentages of the three monomers may vary as follows: 0.1–99.8 wt. % E, 0.1–99.8 wt. % Ac, and 0.1–99.8 wt. % CO. As will be apparent to skilled practitioners, the relative weight percentages of each of the monomers comprising the base polymer effects variation in the adhesive, physical and processing characteristics of these materials. Selection of a suitable base polymer will be dependent upon the final end use application of the hot melt adhesive composition; an appropriate base polymer should be selected in accordance which satisfies these technical considerations.

Conventional tackifying constituents include one or more constituents presently known as useful in hot melt adhesive compositions. Useful conventional tackifying constituents include but are not limited to one or more rosin, rosin esters, derivatives thereof, polyterpenes, as well as aliphatic and/or aromatic hydrocarbon materials which are known useful tackifying constituents.

Conventional wax constituents useful in the practice of the present invention include one or more waxes which are presently known to the art as useful in hot melt adhesive compositions. Such useful waxes include one or more paraffin waxes, microcrystalline waxes, low molecular weight polyethylene waxes, Fisher-Tropsch type waxes, as well as others not recited here.

In accordance with the present invention, a hot melt adhesive composition includes one or more low molecular weight polyethylene copolymers which includes ketone functional moieties and/or hydroxyl functional moieties. These copolymers may be characterized as having a very high melt flow index according to ASTM D-1238, generally in excess of about 3000 dg/min and even higher which makes them difficult to measure; such high values are indicative of low molecular weight materials. Useful ethylene copolymers which include ketone functionality include ethylene/carbon monoxide copolymers which consist of between 0.01–99.99 wt. % ethylene and 0.01–99.99 wt.% carbon monoxide "CO"; preferably useful ethylene copolymers consist of up to 50 wt. % of CO and the remainder consisting of ethylene. Further useful ethylene copolymers which include hydroxyl functionality include at least partially saponified ethylene/vinyl acetate copolymers which are comprised of between 0.01–99.99 wt.% ethylene and 0.01–99.99 wt.% vinyl alcohol; preferred useful ethylene copolymers consist of up to 85 wt. % of vinyl alcohol and the remainder consisting of ethylene units and unsaponified vinyl acetate units. The degree of saponification of an ethylene/vinyl acetate copolymer may be from 1–100%; preferably the degree of saponification is 25% and greater. The ethylene copolymers described may be either random, block, or repeating type copolymers; preferably they are random copolymers.

Optionally, the ethylene copolymers described above may be at least partially oxidized copolymers.

It is also contemplated that additional comonomers may be included in the ethylene copolymers described, so to form terpolymers and the like. By way of example the inclusion of vinyl acetate monomers as a comonomer (or alternately by non-saponified vinyl acetate moieties) to form ethylene/vinyl alcohol/vinyl acetate terpolymer is contemplated in order to impart a more flexible nature to the ethylene copolymer. Further comonomers which may be included include but are not limited to: alkyl acrylates "AAc" to form low molecular weight E/AAc/CO or E/AAc/OH terpolymers including methyl acrylate, ethyl acrylate, n-butyl acrylate and 2-ethylhexylacrylate as the AAc comonomer; and acrylic acid "AA", methacrylic acid "MAA", and maleic anhydride "MA" monomers to form low molecular weight E/AA/CO, E/MAA/CO, and E/MA/CO terpolymers, respectively, and low molecular weight E/AA/OH, E/MAA/OH, and E/MA/OH. These terpolymers are low molecular weight terpolymers having molecular weights within the ranges described above, and/or have high melt indices as described above.

The above low molecular weight ethylene copolymers are random copolymers; what is meant to be understood is that these copolymers do not consist essentially of regularly repeating or block copolymer units. The random copolymer structure provides for the inclusion of the ketone functional moieties as well as the hydroxyl functional moieties within the backbone of the copolymer as well as possible ketone and/or hydroxyl terminal group functionality. Such an important effect as the random copolymer structure with the incorporated ketone and/or hydroxyl functional groups enhances the compatibility of the low molecular weight ethylene copolymers with the base polymer and the tackifying constituent.

The low molecular weight ethylene copolymers may be produced by well known processes, such as by conventional free-radical polymerization process techniques.

Optional constituents which may be included in effective amounts include oxidative and thermal stabilizers. Oxidative stabilizers include tetrakis [ethylene 3-(3', 5'-di-tert-butyl4'hydroxyphenyl) propionate]. These optional constituents may be included in any effective amount; generally they are included in an amount to comprise 5 wt. % and less of the total weight of the hot melt adhesive composition.

Hot melt adhesive compositions comprise the base polymer constituent, a conventional tackifying constituent, a conventional wax, and a low molecular weight polyethylene copolymer constituent may be in a range of weight proportions wherein the base polymer constituent may comprise between 1–98 wt. %, the tackifying constituent between 1–98 wt. %, and the sum total of the weight of the conventional wax constituent and of the low molecular weight polyethylene copolymer constituent between 1–98 wt. %. It is to be understood that the low molecular weight polyethylene copolymer may be used to substitute a portion or all of the conventional wax constituent in a hot melt adhesive formulation, or alternately, may be considered as a separate additive constituent. Selection of the appropriate proportions of these three constituents is best determined by experimental analysis; as is apparent to the skilled practitioner, the relative proportion of each constituent imparts a different physical and/or processing characteristic upon the ultimate hot melt adhesive composition formed. Generally, these four constituents are present in the ranges of between about 0.10% wt, and up to about 95% wt. Further, the inclusion of effective amounts of the one or more conventional additives is frequently desirable; typically these comprise up to 5% wt. based on the sum of the weight of the base polymer constituent, the conventional tackifying constituent, the conventional wax constituent, and the low molecular weight polyethylene copolymer constituent. Further exemplary compositions are more particularly described in the Examples below.

The hot melt adhesive compositions may be produced according to conventional techniques, such as by providing weighed amounts of the respective constituents, heating the blended constituents to at least the melting point of the lowest melting constituent and effectively mixing the same. Subsequently, the mixture may be cooled and the adhesive composition recovered. In an alternative method, a measured amount of at least one of the constituents is provided to a vessel wherein it is heated to its melting point, and afterwards weighed amounts of the additional constituents are added and blended to form a uniformly mixed composition which is allowed to cool to room temperature (68° F., 20° C.) and solidify. Afterwards the cooled adhesive composition is removed.

The present inventor has found that his inventive hot melt adhesive compositions exhibit a striking improvement in the adhesive strength when applied to a wide variety of substrates, both polar substrates, i.e., metals, polycarbonates, polyesters such as PET, halogenated polymeric materials such as polyvinyl chloride materials, and further to a wide variety of non-polar or moderately polar materials, including polyolefins.

The present inventor has further found that the improved hot melt adhesive compositions as being taught herein are useful in the formation of structures and articles wherein two substrates either of the same or different polar characteristics may be joined by an intermediate layer of the hot melt adhesive compositions having interfacial contact with the surfaces of the substrates; such structures may be formed by conventional techniques.

While not wishing to be bound by any theory, it is believed by the present inventor the inclusion of hydroxyl and ketone moieties provides polar moieties to the ethylene copolymer molecule of which they form a part; the degree of polarity of these included moieties in an ethylene copolymer are comparable with the polarity of ethylene/vinyl acetate copolymers which are known to the art, and yet, unlike the ethylene/vinyl acetate copolymers of the prior art wherein the acetoxy moieties used to impart polarity to the molecule are relatively sterically large and inhibit the formation of a crystallized form of the ethylene/vinyl acetate upon cooling, the inclusion of hydroxyl and ketone moieties for providing polar moieties to the ethylene copolymer molecule of the present invention are relatively more polar than the acetoxy moieties, while simultaneously are sterically smaller, thus allowing for formation of a more crystallized form of the ethylene copolymers upon cooling.

It is further believed by the inventor that these low molecular weight copolymers may provide faster setting speed adhesives than low molecular weight ethylene copolymer waxes of similar polarity, but, containing comonomers such as vinyl acetate, methyl acrylate, ethyl acrylate, n-butyl acrylate, 2-ethylhexyl acrylate and acrylic acid because the latter types of copolymers are less crystalline than the E/CO or E/OH copolymers which are among the teaching of the present specification. It is believed that such E/Co and E/OH copolymers provide set speed comparable or better than conventional hydrocarbon waxes.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

The following constituents were used in the Examples:

"E/n-butyl acrylate/CO" is an ethylene/n-butyl acrylate/carbon monoxide terpolymer which is characterized as having a melt index of 100 dg/minute according to ASTM D-1238, a ring and ball softening point of 205° F. (95° C.), and a glass transition temperature, "Tg" of −47° C. It is presently commercially available from E. I. DuPont de Nemours, Inc., Del., U.S.A. as "EP-4043".

"Rosin Ester" is Foral® 85, a conventially known tackifying constituent which includes the characteristics of: softening point of 80–88° C. by the "Hercules Drop Method", and acid number of 3–10. It is presently commercially available from Hercules Inc., Del., U.S.A.

"Microcrystalline wax" was Multiwax® 180W, a conventional microcrystalline wax commercially available from Witco Corp., N.Y., U.S.A and characterized as featuring a melting point of 82–88° C. according to ASTM D-127, and a needle penetration at 25° C. of 15–20 dmm according to ASTM D-1321. "Stabilizer" was tetrakis [ethylene 3-(3', 5'-di-tert-butyl- 4'hydroxyphenyl) propionate] commercially available as "Irganox® 1010", from Ciba-Geigy and used as an oxidative stabilizer.

"E/VA copolymer I" was an ethylene/vinyl acetate copolymer used as the base polymer and characterized as being 27.2–28.8 % wt. of vinyl acetate groups, and having a Melt Index according to ASTM D-1238 of 365–440 dg/min. It is presently commercially available from E. I. DuPont de Nemours Co. as "ELVAX 210".

"E/VA copolymer II" was an ethylene/vinyl acetate copolymer used as the base polymer and characterized as being 27.2–28.8 % wt. of vinyl acetate groups, and having a Melt Index according to ASTM D-1238 of 38–48 dg/min. It is presently commercially available from E. I. DuPont de Nemours Co. as "ELVAX 240".

The constituents illustrated on Table 1 and labeled in the column headed "Copolymers" were the ethylene copolymers according to the present inventive teaching. All of the ethylene copolymers are low molecular weight random type ethylene/carbon monoxide copolymers.

following: (a) a 0.08 mm thick film of the hot melt adhesive was formed; (b) the film was placed between 2 sheets of the tested substrate to form a multilayer structure therefrom; and (c) subsequently the multilayer structure was laminated by heat sealing it at 135° C. for 15 seconds in the case of aluminium foil, Lexan ®, or Mylar ® substrates, or at 135° C. for 20 seconds for the polypropylene substrate, or 110° C. for 15 seconds for the PVC film substrate. Lamination was performed using a Seal ® Model 210M press. The samples were allowed to cool, and afterwards tested. Alternately, after the lamination step, certain of the samples were heat aged for 7 days in a hot air circulating oven maintained at a temperature of 135° F. (56.5° C.) after which

TABLE 1

| Copolymer | Mettler Drop Point, deg. °C. | Brookfield Viscosity, centipoises at 140° C. | Penetrometer Hardness, dmm | carbon monoxide, % | density, g/cc |
|---|---|---|---|---|---|
| AX-1 | 106.6 | 385 | 3.2 | 1.4 | 0.921 |
| AX-2 | 107.9 | 165 | 2.2 | 4.5 | 0.939 |
| AX-3 | 96.5 | 230 | 7 | 13.7 | 0.958 |
| AX-4 | 98.9 | 245 | 10.5 | 30 | 1.075 |
| AX-5* | 102.8 | 217 | 4.5 | 2.6 | — |
| AX-6** | 93.5 | 725 | 4 | — | — |
| AX-7*** | 106.5 | 725 | 1.7 | — | — |
| AX-8 | 100.6 | 300 | 3.4 | 8.3 | 0.944 |
| AX-9 | 96.8 | 185 | 6.1 | 11 | 0.948 |

*Oxidized E-Co copolymer.
**AX-6 is reported as having a number average molecular weight by vapor phase osmometry of 2400, and 98% hydrolyzed, with a hydroxyl number of 150.
***AX-7 is reported as having a number average molecular weight by vapor phase osmometry of 2910, and 95% hydrolyzed, with a hydroxyl number of 83.

Preparation of the samples according to the Examples was in accordance with the following general procedure: weighed amounts of the individual constituents used to formulate the respective Example composition were provided to a vessel which was then heated over a heating mantle until all of the constituents were melted, which was mixed with stirring rod to assure good mixing. Subsequently, the heat was withdrawn and the composition allowed to cool until hard. The composition was then removed for subsequent melting operations and testing.

Testing of the Example compositions were in accordance with the following test protocols.

"SAFT" the shear adhesion failure temperature which includes the following protocol. First, using a 0.08 mm thick sheet of a film formed entirely of the hot melt adhesive compositions, 2.54 cm by 2.54 cm lap shear bonds were formed to 60 lb. weight kraft paper using a Seal Model 210M press at 177° C. for 3 seconds. Afterwards, 3 such prepared test samples were hung vertically in an air circulating oven at 32° C. and a 1 kg mass was suspended from the bottom strip; the temperature was raised at a rate of 5° C. per 15 minutes and the sample observed; the time and temperature of the failure was determined and the average of the three test samples was reported.

Viscosity was determined by the use of a standard Brookfield Thermocel viscometer.

The Mettler Softening Point was determined according to the protocols of ASTM D-3954.

"T-Peel Adhesion" was in accordance with ASTM D-1876 testing procedures. The tested substrates included: aluminum foil, Lexan ® (polycarbonate), Mylar ® (polyethylene terephthalate), untreated polypropylene film, having thicknesses of either 5 mil [0.02 cm] or 13 mil [0.051 cm], and polyvinyl chloride film having thickness of 8 mil [0.0031 cm]. The T-Peel Adhesion was evaluated for each substrate in accordance with the these samples which are considered as the "heat aged" samples, were tested after they had been allowed to cool to room temperature, approx. 20° C.

Examples "Control", 1–5 as indicated on Table 2 illustrate various compositions. The Control example illustrates a composition as is known to the prior art, while Examples 1–5 illustrate compositions according to the present invention; various amounts of different ethylene/carbon monoxide random copolymers, including an oxidized ethylene/carbon monoxide random copolymer, as described in the foregoing description are used, both in conjunction with the conventional microcrystalline wax as well as without said wax. Table 3 reports the resultant physical properties of the respective Example compositions on the various substrates, including the SAFT, viscosity and adhesion properties. As may be seen from these reported results, modest to significant improvements in the adhesion for both initial and aged samples were realized, dependent upon the substrate used. Of particular note are the compositions according to Examples 3 and 4 which surprisingly show significant improvements in adhesion to untreated polypropylene and aluminum foil, both initially and subsequent to heat aging. Example 3 also exhibits significantly improved adhesivity to the polyester substrate, Mylar ®.

TABLE 2

|  | Example | | | | | |
|---|---|---|---|---|---|---|
|  | Control | 1 | 2 | 3 | 4 | 5 |
| E/n-butyl acrylate/CO | 34.8 | 34.8 | 34.8 | 34.8 | 34.8 | 34.8 |
| rosin ester | 40 | 40 | 40 | 40 | 40 | 40 |
| microcrystalline wax | 25 | 20 | 20 | — | — | — |
| AX-1 | — | 5 | — | — | — | — |

TABLE 2-continued

| | Example | | | | | |
|---|---|---|---|---|---|---|
| | Control | 1 | 2 | 3 | 4 | 5 |
| AX-2 | — | — | 5 | — | — | — |
| AX-3 | — | — | — | 25 | — | — |
| AX-4 | — | — | — | — | 25 | — |
| AX-5 | — | — | — | — | — | 25 |
| stabilizer | 0.2 | 0.2 | 0.2 | 0.2 | 0.2 | 0.2 | to untreated polypropylene substrates, particularly shown by Examples 12, 14 and 15 are of special note. The composition according to 12 shows significantly improved adhesion to a polycarbonate substrate, Lexan ®. The composition according to 9 shows significantly improved adhesion to the polyester substrate, Mylar ®.

TABLE 3

| | Example | | | | | |
|---|---|---|---|---|---|---|
| Physical Properties: | Control | 1 | 2 | 3 | 4 | 5 |
| SAFT: seconds at (deg. F.) | 229 (131 F.) | 110 (131 F.) | 629 (122 F.) | 305 (149 F.) | 790 (122 F.) | 250 (131 F.) |
| SAFT: seconds at (deg. C.) | 229 (54.5 C.) | 110 (54.5 C.) | 629 (49.5 C.) | 305 (64.3 C.) | 790 (49.5 C.) | 250 (54.5 C.) |
| Viscosity, Cps at 350 deg. F., 143 deg. C.: | 1325 | 975 | 1200 | 2650 | 7000 | 2500 |
| Mettler Soft. Pt. (deg. C.) | 86.2 | 91 | 89.6 | 91.5 | 88.4 | 98.9 |
| T-Peel Adhesion | | | | | | |
| Aluminum Foil, initial lb/in (g/cm) | 2 [357.2] | 3 [535] | 4.7 [840] | 4.1 [732] | 4.7 [840] | 3.5 [625] |
| Aluminum Foil, 7 days lb/in[g/cm] | 1.15 [205] | 3.02 [540] | 4.28 [764] | 5.23 [934] | 5 [893] | 4.36 [779] |
| Lexan, initial lb/in (g/cm) | 6.9 [1232] | 5.3 [947] | 6.7 [1197] | 6.2 [1107] | 3.9 [696] | 7 [1250] |
| Lexan, 7 days lb/in (g/cm) | 6.5 [1161] | 5.2 [928] | 7.7 [1375] | 7.1 [1268] | 4.04 [722] | 7.5 [1400] |
| Mylar, initial lb/in (g/cm) | 5.69 [1016] | 5.27 [941] | 6.47 [1155] | 7.48 [1336] | 4.7 [839] | 6.66 [1190] |
| Mylar, 7 days lb/in [g/cm] | 5.89 [1051] | 5.64 [1007] | 7.15 [1277] | 7.17 [1280] | 7.46 [1332] | 7.8 [1394] |
| untr. polypropylene, init. lb/in [g/cm] | 0.94 [167] | 2.1 [375] | 0.17 [30.4] | 2.01 [359] | 3.49 [623.3] | 0.45 [80.4] |
| untr. polypropylene, 7 days lb/in [g/cm] | 0 | 0.93 [166] | 0.27 [48.2] | 5.06 [903] | 4.92 [878.7] | 0.46 [82.2] |
| PVC film*, initial lb/in [g/cm] | 5.9 [1053] | 5.6 [1000] | 5.5 [982] | 7.2 [1286] | 6 [1071] | 6.3 [1125] |
| PVC film*, 7 days lb/in [g/cm] | 0.26 [46.5] | 0.32 [57.2] | 0.38 [67.9] | 0.07 [12.5] | 0.29 [51.8] | 0.32 [57.15] |

*PVC film thickness, 13 mils [0.0051 cm]

Examples Control 2, 6–15 indicated on Table 4 further illustrate additional compositions, wherein Example "Control 2" is a further control composition according to the prior art, and Examples 6–15 are in accordance with the present invention's teaching. Examples 6–15 as indicated on Table 4 illustrate the use of an E/VA type base copolymer, characterized as having a melt index of 400 dg/minute, and further including the characteristics described above, with varying amounts of differing low molecular weight ethylene random copolymers as described above. The Examples Control 2, 6–15 were tested and the test results indicated on Table 5 illustrate the moderate to significant improvements in the adhesion for both initial and aged samples. Of particular note are the compositions according to Examples 9–15 which surprisingly show significantly improved adhesive characteristics for both as-applied adhesive samples as well as aged samples. The significant improvements in adhesion, particularly as shown

TABLE 4

| | Example | | | | | |
|---|---|---|---|---|---|---|
| | Control 2 | 6 | 7 | 8 | 9 | 10 |
| E/VA copolymer 1 | 42.7 | 42.7 | 42.7 | 42.7 | 42.7 | 42.7 |
| rosin ester | 32 | 32 | 32 | 32 | 32 | 32 |
| microcrystalline wax | 25 | 20 | 20 | 20 | 20 | — |
| AX-1 | — | 5 | — | — | — | 25 |
| AX-2 | — | — | — | — | — | — |
| AX-6 | — | — | — | — | 25 | — |
| AX-7 | — | — | — | 5 | — | — |
| stabilizer | 0.3 | 0.3 | 0.3 | 0.3 | 0.3 | 0.3 |

| | Example | | | | |
|---|---|---|---|---|---|
| | 11 | 12 | 13 | 14 | 15 |
| E/VA copolymer 1 | 42.7 | 42.7 | 42.7 | 42.7 | 42.7 |
| rosin ester | 32 | 32 | 32 | 32 | 32 |
| microcrystalline wax | — | — | 20 | — | — |
| AX-2 | 25 | — | — | — | — |
| AX-6 | — | 25 | — | — | — |
| AX-3 | — | — | 5 | 25 | — |
| AX-4 | — | — | — | — | 25 |
| stabilizer | 0.3 | 0.3 | 0.3 | 0.3 | 0.3 |

TABLE 5

| | Example | | | | | |
|---|---|---|---|---|---|---|
| Physical Properties: | Control 2 | 6 | 7 | 8 | 9 | 10 |
| SAFT: seconds at (deg. F.) | 103 (149 F.) | 196 (149 f.) | 186 (149 F.) | 332 (149 F.) | 130 (140 F.) | 702 (140 F.) |
| SAFT: seconds at (deg. C.) | 103 (64 C.) | 196 (64 C.) | 186 (64 C.) | 332 (64 C.) | 130 (59.4 C.) | 702 (59.4 C.) |
| Aluminum Foil, initial lb/in (g/cm) | 4.4 [786] | 2.02 [360] | 2.1 [375] | 1.96 [350] | 2 [357.2] | 2.8 [500] |
| Aluminum Foil, 7 days lb/in [g/cm] | 1.32 [235.8] | 1.32 [235.7] | 1.28 [228.6] | 1.59 [284] | 2.33 [416.1] | 2.99 [534] |
| Lexan, initial lb/in (g/cm) | 4.66 [832.3] | 5.36 [967.3] | 5.15 [919.8] | 5.34 [953.7] | 5.77 [1030] | 4 [714.4] |
| Lexan, 7 days lb/in (g/cm) | 2.83 [505] | 1.99 [355] | 2.46 [439.4] | 2.1 [375] | 2.5 [446.5] | 3.63 [648.3] |
| Mylar, initial | 3.79 [677] | 4.3 [768] | 4.58 [818] | 5.11 [912.6] | 5.03 [898.4] | 5.75 [1026] |

TABLE 5-continued

| | | | | | | | |
|---|---|---|---|---|---|---|---|
| lb/in (g/cm) | | | | | | | |
| Mylar, 7 days | 2.28 [407] | 2.07 [370] | 2.61 [466] | 2.73 [487.6] | 4.57 [816.2] | 3.77 [673.3] | |
| lb/in [g/cm] | | | | | | | |
| untr. polypropylene, init. | 0.14 [25] | 1.28 [228.6] | 0.2 [35.7] | 0.2 [35.7] | 0.46 [82.2] | 0.65 [116.1] | |
| 5 mil, lb/in [g/cm] | | | | | | | |
| untr. polypropylene, 7 days | 1.42 [253.6] | 0.87 [155.3] | 0.3 [53.6] | 0.41 [73.2] | 4.18 [746.5] | 0.67 [119.6] | |
| 5 mil, lb/in [g/cm] | | | | | | | |
| PVC film*, initial | 1.48 [264.3] | 0.8 [142.8] | 1.11 [198.2] | 1.2 [214.3] | 1.59 [284] | 2.12 [378.6] | |
| lb/in [g/cm] | | | | | | | |
| PVC film*, 7 days | 0.06 [10.7] | 0.05 [8.9] | 0.05 [8.9] | 0.06 [10.7] | 0.05 [8.93] | 0.06 [10.7] | |
| lb/in [g/cm] | | | | | | | |

| | Example | | | | |
|---|---|---|---|---|---|
| Physical Properties: | 11 | 12 | 13 | 14 | 15 |
| SAFT: seconds at (deg. F.) | 873 (158 F.) | 709 (131 F.) | 401 (140 F.) | 517 (149 F.) | 488 (131 F.) |
| SAFT: seconds at (deg. C.) | 873 (69.3 C.) | 7.9 (54.5 C.) | 401 (59.5 C.) | 517 (64.5 C.) | 488 (54.5 C.) |
| T-Peel Adhesion | | | | | |
| Aluminum Foil, initial lb/in (g/cm) | 3.44 [614] | 3.39 [605] | 1.9 [339] | 2.72 [486] | 2.08 [371.5] |
| Aluminum Foil, 7 days lb/in [g/cm[ | 3.6 [643] | 3.54 [632] | 1.36 [243] | 3.24 [578.7] | 2.08 [371.5] |
| Lexan, initial lb/in (g/cm) | 5.62 [1003] | 7.15 [1277] | 5.37 [959] | 2.93 [523] | 1.12 [200] |
| Lexan, 7 days lb/in (g/cm) | 5.64 [1007] | 6.53 [1166] | 5.29 [943] | 3.79 [677] | 0.96 [171.5] |
| Mylar, initial lb/in (g/cm) | 5.75 [1027] | 0.95 [169.7] | 5.08 [907] | 1.3 [232] | 2.78 [496.5] |
| Mylar, 7 days lb/in [g/cm] | 4.8 [863] | 5.37 [959] | 1.24 [221] | 4.7 [850] | 4.17 [744.7] |
| untr. polypropylene, init. 5 mil, lb/in [g/cm] | 0.98 [175] | 4.94 [882] | 0.24 [42.9] | 4.7 [852] | 3.78 [675] |
| untr. polypropylene, 7 days 5 mil, lb/in [g/cm] | 0.84 [150] | 4.03 [719] | 2.08 [371] | 4.37 [780] | 4.14 [740] |
| PVC film*, initial lb/in [g/cm] | 2.27 [405] | 2.97 [530] | 1.26 [225] | 2.54 [454] | 0.81 [144.6] |
| PVC film*, 7 days lb/in [g/cm] | 0.07 [12.5] | 0.06 [10.7] | 0.07 [12.5] | 0.06 [10.7] | 0.09 [16] |

TABLE 6

| | Example | | | | | | |
|---|---|---|---|---|---|---|---|
| | Control 3 | 16 | 17 | 18 | 19 | 20 | 21 |
| E/VA copolymer 11 | 42.7 | 37.7 | 37.7 | 37.7 | 37.7 | 37.7 | 37.7 |
| rosin ester | 32 | 32 | 32 | 32 | 32 | 32 | 32 |
| microcrystalline wax | 25 | 25 | 15 | 25 | 15 | 25 | 25 |
| AX-1 | — | 5 | 15 | — | — | — | — |
| AX-2 | — | — | — | 5 | 15 | — | — |
| AX-8 | — | — | — | — | — | 5 | — |
| AX-9 | — | — | — | — | — | — | 5 |
| stabilizer | 0.3 | 0.3 | 0.3 | 0.3 | 0.3 | 0.3 | 0.3 |

TABLE 7

| | Example | | | | | | |
|---|---|---|---|---|---|---|---|
| Physical Properties: | Control 3 | 16 | 17 | 18 | 19 | 20 | 21 |
| Viscosity, cps at | | | | | | | |
| 350 deg. F, 143 deg C.: | 5125 | 3250 | 4600 | 3200 | 2700 | 2150 | 2150 |
| Mettler Soft. Pt. (deg. C.): | 86.5 | 97.2 | 101 | 96.3 | 101.3 | 89.6 | 87 |
| T-Peel Adhesion | | | | | | | |
| Aluminum Foil, initial lb/in (g/cm) | 2.3 [441] | 2.54 [453] | 2.68 [479] | 2.09 [373] | 2.98 [532] | 2.15 [384] | 2.21 [395] |
| Aluminum Foil, 7 days lb/in [g/cm] | 1.61 [287.5] | 1.92 [343] | 2.34 [418] | 1.97 [352] | 2.26 [403] | 1.16 [207] | 1.6 [285] |
| Lexan, initial lb/in (g/cm) | 5 [893] | 5.68 [1015] | 5.34 [954] | 6.09 [1088] | 6.01 [1073] | 6.33 [1130] | 5.78 [1032] |
| Lexan, 7 days lb/in (g/cm) | 3.41 [609] | 5.14 [918] | 4.72 [843] | 5.17 [923] | 5.94 [1061] | 6.24 [1114] | 4.8 [864] |
| Mylar, initial lb/in (g/cm) | 2.89 [516] | 2.96 [528] | 3.27 [584] | 2.83 [505] | 3.4 [608] | 3 [535.8] | 2.91 [520] |
| Mylar, 7 days lb/in [g/cm] | 1.46 [260] | 2.31 [413] | 2.72 [486] | 3.13 [559] | 1.86 [332] | 2.45 [437.6] | 1.13 [202] |
| untr. polypropylene, init. 5 mil, lb/in [g/cm] | 0.24 [43] | 0.2 [35.7] | 0.41 [73.2] | 0.2 [35.7] | 0.32 [57.7] | 0.22 [39.3] | 0.83 [148] |
| untr. polypropylene, 7 days 5 mil, lb/in [g/cm] | 0.72 [129] | 0.59 [105] | 0.61 [109] | 0.75 [134] | 0.34 [60.7] | 0.23 [41] | 0.24 [43] |
| PVC film*, initial lb/in [g/cm] | 2.26 [403] | 2.69 [480] | 2.78 [497] | 2.27 [405] | 3.4 [607] | 2.73 [487.6] | 2.09 [373] |

Examples Control 3, 16–21 indicated on Table 6 further illustrate further compositions, wherein Example "Control 3" is a further control composition according to the prior art, and Examples 16–21 are in accordance with the present invention's teaching. The Examples indicated on Table 6 illustrate the use of an E/VA type base copolymer, characterized as having a melt index of 43 dg/min, and further including the characteristics described above, with varying amounts of differing ethylene random copolymers as described above. The Examples Control 3, 16–21 were tested and the test results indicated on Table 7 illustrate the moderate to significant improvements in the adhesion for both initial and aged samples. Of particular note are the results reported for adhesion to the polycarbonate substrate, Lexan ®, particularly by Examples 16–21.

It will be appreciated that the instant specifications and examples set forth herein are by way of illustration and not limitation, and that various modifications and changes may be made without departing from the spirit and scope of the present invention, whose limitations are bounded only by the appendant claims.

What is claimed is:

1. A laminar structure comprising:
   (I) a first substrate;
   (II) a second substrate; and
   (III) a hot melt adhesive comprising:
   (a) a base polymer constituent having a melt index of 0.2 to 3000g/10min as measured by ASTM D-1238;
   (b) a tackifying constituent;
   (c) optionally a wax constituent; and
   (d) a low molecular weight constituent having a melt index of greater than 3000g/10 min as measured by ASTM D-1238, said low molecular weight constituent being selected from the group consisting of:
      (i) random ethylene/carbon monoxide copolymers;
      (ii) random ethylene/vinyl alcohol copolymers consisting of less than about 10 mol percent vinyl alcohol;
      (iii) random ethylene/vinyl alcohol/vinyl acetate terpolymers consisting of less than about 10 mol percent vinyl alcohol;
      (iv) random polymers of (i), (ii), and (iii) with additional recurring monomeric units derived from monomers selepted from the group consisting of alkyl acrylates, acrylic acid, methacrylic acid, maleic anhydride, and vinyl acetate; and
      (v) at least partially oxidized said (i), (ii), (iii), and (iv)
   wherein said first substrate (I) and said second substrate (II) are joined by an intermediate layer of said hot melt adhesive (III) in interfacial contact therewith and said low molecular weight constituent (d) is present in an amount sufficient to provide greater adhesion to said substrates than a comparative composition in which said low molecular weight constituent is absent.

2. The laminar structure of claim 1 wherein said low molecular weight constituent (d) is an ethylene/carbon monoxide copolymer which consists of about 0.01 to about 99.99 weight percent ethylene and about 0.01 to about 99.99 weight percent carbon monoxide.

3. The laminar structure of claim 1 wherein said low molecular weight constituent (d) is an ethylene/carbon monoxide copolymer which consists of about 50 to about 99.99 weight percent ethylene and about 0.01 to about 50 weight percent carbon monoxide.

4. The laminar structure of claim 1 wherein said hot melt adhesive (III) further comprises a wax.

5. The laminar structure of claim 4 wherein said wax is selected from the group consisting of paraffin waxes, microcrystalline waxes, low molecular weight polyethylene waxes, and Fischer-Tropsch waxes.

6. The laminar structure of claim 1 wherein said low molecular weight constituent (d) is at least partially oxidized.

7. The laminar structure of claim 1 wherein said ethylene/vinyl alcohol/vinyl acetate terpolymer (iii) is at least 25 percent saponified.

8. The laminar structure of claim 1 wherein said first substrate (I) and said second substrate (II) are selected from the group consisting of aluminum foil, polycarbonate, polyethylene terephthalate, polypropylene, and polyvinyl chloride.

9. The laminar structure of claim 1 wherein said low molecular weight constituent (d) has a Brookfield viscosity, measured at 140° C., of about 165 to about 725 centipoises.

10. A laminar structure comprising:
    (I) a first substrate;
    (II) a second substrate; and
    (III) a hot melt adhesive comprising:
    (a) about 1 to about 98 weight percent of a base polymer constituent having a melt index of 0.2 to 3000g/10min as measured by ASTM D-1238;
    (b) about 1 to about 98 weight percent of a tackifying constituent;
    (c) optionally a wax constituent; and
    (d) a low molecular weight constituent having a melt index of greater than 3000g/10 min as measured by ASTM D-1238, said low molecular weight constituent being selected from the group consisting of:
       (i) random ethylene/carbon monoxide copolymers;
       (ii) random ethylene/vinyl alcohol copolymers;
       (iii) random ethylene/vinyl alcohol/vinyl acetate terpolymers;
       (iv) random polymers of (i), (ii), and (iii) with additional recurring monomeric units derived from monomers selected from the group consisting of alkyl acrylates, acrylic acid, methacrylic acid, maleic anhydride, and vinyl acetate; and
       (v) at least partially oxidized said (i), (ii), (iii), and (iv)
    wherein said first substrate (I) and said second substrate (II) are joined by an intermediate layer of said hot melt adhesive (III) in interfacial contact therewith and said low molecular weight constituent (d) is present in an amount sufficient to provide greater adhesion to said substrates than a comparative composition in which said low molecular weight constituent is absent.

11. The laminar structure of claim 10 wherein said hot melt adhesive (III) further comprises a wax.

12. The laminar structure of claim 10 wherein said low molecular weight constituent (d) has a Brookfield viscosity, measured at 140° C., of about 165 to about 725 centipoises.

13. A laminar structure comprising:
    (I) a first aluminum foil substrate;
    (II) a second aluminum foil substrate; and
    (III) a hot melt adhesive comprising:
    (a) about 35 weight percent of an ethylene/n-butyl acrylate/carbon monoxide terpolymer having a melt index of about 100g/10 min as measured by ASTM D-1238;

(b) about 40 weight percent of a tackifying constituent;

(c) about 0 to about 20 weight percent of a wax constituent; and (d) about 5 to about 25 weight percent of a low molecular weight ethylene/carbon monoxide constituent with a Brookfield viscosity, measured at 140° C., of about 165 to about 385 centipoises, wherein said first aluminum foil substrate (I) and said second aluminum foil substrate (II) are joined by an intermediate layer of said hot melt adhesive (III) in interfacial contact therewith and said hot melt adhesive (III) has an initial T-Peel Adhesion to said first aluminum foil substrate (I) and said second aluminum foil substrate (II), measured according to ASTM D-1876, of at least about 3 lb./in. and a T-Peel Adhesion of at least about 3 lb./in. following aging of said substrates for 7 days at 56.5° C.

14. The laminar structure of claim 13 wherein said hot melt adhesive (III) comprises:

(a) about 35 weight percent of said ethylene/n-butyl acrylate/carbon monoxide terpolymer;

(b) about 40 weight percent of said tackifying constituent; and (c) about 25 weight percent of an oxidized low molecular weight ethylene/carbon monoxide constituent with a Brookfield viscosity, measured at 140° C., of about 217 centipoises, wherein said hot melt adhesive (III) has an initial T-Peel Adhesion to said first aluminum foil substrate (I) and said second aluminum foil substrate (II), measured according to ASTM D-1876, of at least about 3.5 lb./in. and a T-Peel Adhesion of at least about 4.4 lb./in. following aging of said substrates for 7 days at 56.5° C.

15. The laminar structure of claim 13 wherein said hot melt adhesive (III) comprises:

(a) about 35 weight percent of said ethylene/n-butyl acrylate/carbon monoxide terpolymer;

(b) about 40 weight percent of said tackifying constituent; and (c) about 25 weight percent of a low molecular weight ethylene/carbon monoxide constituent with a Brookfield viscosity, measured at 140° C., of about 230 to about 245 centipoises and a carbon monoxide content of about 13.7 to about 30 percent by weight, wherein said hot melt adhesive (III) has an initial T-Peel Adhesion to said first aluminum foil substrate (I) and said second aluminum foil substrate (II), measured according to ASTM D-1876, of at least about 4.1 lb./in. and a T-Peel Adhesion of at least about 5 lb./in. following aging of said substrates for 7 days at 56.5° C.

16. The laminar structure of claim 15 wherein said hot melt adhesive (III) has an initial T-Peel Adhesion to said first aluminum foil substrate (I) and said second aluminum foil substrate (II), measured according to ASTM D-1876, of at least about 4.7 lb./in. and a T-Peel Adhesion of at least about 5 lb.in. following aging of said substrates for 7 days at 56.5° C.

17. A laminar structure comprising:

(I) a first polyvinyl chloride substrate;

(II) a second polyvinyl chloride substrate; and (III) a hot melt adhesive comprising:

(a) about 35 weight percent of an ethylene/n-butyl acrylate/carbon monoxide terpolymer having a melt index of about 100g/10 min as measured by ASTM D-1238;

(b) about 40 weight percent of a tackifying constituent; and (c) about 25 weight percent of a low molecular weight ethylene/carbon monoxide constituent with a Brookfield viscosity, measured at 140° C., of about 230 centipoises, and a carbon monoxide content of about 13.7 weight percent, wherein said first polyvinyl chloride substrate (I) and said second polyvinyl chloride substrate (II) are joined by an intermediate layer of said hot melt adhesive (III) in interfacial contact therewith and said hot melt adhesive (III) has an initial T-Peel Adhesion to said first polyvinyl chloride substrate (I) and said second polyvinyl chloride substrate (II), measured according to ASTM D-1876, of at least about 6.3 lb./in. and a T-Peel Adhesion of at least about 0.32 lb./in. following aging of said substrates for 7 days at 56.5° C.

18. A laminar structure comprising:

(I) a first polypropylene substrate;

(II) a second polypropylene substrate; and (III) a hot melt adhesive comprising:

(a) about 43 weight percent of an ethylene/vinyl acetate copolymer having a melt index of about 365 to about 440g/10 min as measured by ASTM D-1238, and a vinyl acetate content of about 27.2 to about 28.8 weight percent;

(b) about 32 weight percent of a tackifying constituent;

(c) about 0 to about 20 weight percent of a wax constituent; and (d) about 5 to about 25 weight percent of a low molecular weight ethylene/carbon monoxide constituent with a Brookfield viscosity, measured at 140° C., of about 230 to about 245 centipoises, and a carbon monoxide content of about 13.7 to about 30 weight percent, wherein said first polypropylene substrate (I) and said second polypropylene substrate (II) are joined by an intermediate layer of said hot melt adhesive (III) in interfacial contact therewith and said hot melt adhesive (III) has an initial T-Peel Adhesion to said first polypropylene substrate (I) and said second polypropylene substrate (II), measured according to ASTM D-1876, of at least about 3.8 lb./in. and a T-Peel Adhesion of at least about 4.1 lb./in. following aging of said substrates for 7 days at 56.5° C.

19. The laminar structure of claim 18 wherein said hot melt adhesive (III) comprises:

(a) about 43 weight percent of said ethylene/vinyl acetate copolymer;

(b) about 32 weight percent of said tackifying constituent;

(c) about 0 to about 20 weight percent of said wax constituent; and (d) about 5 to about 25 weight percent of said low molecular weight ethylene/carbon monoxide constituent with a Brookfield viscosity, measured at 140° C., of about 230 centipoises, wherein said hot melt adhesive (III) has an initial T-Peel Adhesion to said first polypropylene substrate (I) and said second polypropylene substrate (II), measured according to ASTM D-1876, of at least about 4.7 lb./in. and a T-Peel Adhesion of at least about 4.4 lb./in. following aging of said substrates for 7 days at 56.5° C.

20. A laminar structure comprising:

(I) a first polycarbonate substrate;
(II) a second polycarbonate substrate; and
(III) a hot melt adhesive comprising:
  (a) about 43 weight percent of an ethylene/vinyl acetate copolymer having a melt index of about 365 to about 440g/10 min as measured by ASTM D-1238, and a vinyl acetate content of about 27.2 to about 28.8 weight percent;
  (b) about 32 weight percent of a tackifying constituent;
  (c) about 20 weight percent of a wax constituent; and
  (d) about 5 weight percent of a low molecular weight ethylene/carbon monoxide constituent with a Brookfield viscosity, measured at 140° C., of about 725 centipoises, and a carbon monoxide content of about 13.7 to about 30 weight percent,
wherein said first polycarbonate substrate (I) and said second polycarbonate substrate (II) are joined by an intermediate layer of said hot melt adhesive (III) in interfacial contact therewith and said hot melt adhesive (III) has an initial T-Peel Adhesion to said first polycarbonate substrate (I) and said second polycarbonate substrate (II), measured according to ASTM D-1876, of at least about 5.4 lb./in. and a T-Peel Adhesion of at least about 5.3 lb./in. following aging of said substrates for 7 days at 56.5° C.

21. The laminar structure of claim 20 wherein said hot melt adhesive (III) has an initial T-Peel Adhesion to said first polycarbonate substrate (I) and said second polycarbonate substrate (II), measured according to ASTM D-1876, of at least about 5.6 lb./in. and a T-Peel Adhesion of at least about 5.6 lb./in. following aging of said substrates for 7 days at 56.5° C.

22. A laminar structure comprising:
(I) a first polyethylene terephthalate substrate;
(II) a second polyethylene terephthalate substrate; and
(III) a hot melt adhesive comprising:
  (a) about 43 weight percent of an ethylene/vinyl acetate copolymer having a melt index of about 365 to about 440g/10 min as measured by ASTM D-1238, and a vinyl acetate content of about 27.2 to about 28.8 weight percent;
  (b) about 32 weight percent of a tackifying constituent;
  (c) about 20 weight percent of a wax constituent; and
  (d) about 5 weight percent of a low molecular weight ethylene/vinyl alcohol constituent with a Brookfield viscosity, measured at 140° C., of about 725 centipoises, and a number average molecular weight, measured by vapor phase osmometry, of about 2400,
wherein said first polyethylene terephthalate substrate (I) and said second polyethylene terephthalate substrate (II) are joined by an intermediate layer of said hot melt adhesive (III) in interfacial contact therewith and said hot melt adhesive (III) has an initial T-Peel Adhesion to said first polyethylene terephthalate substrate (I) and said second polyethylene terephthalate substrate (II), measured according to ASTM D-1876, of at least about 5.0 lb./in. and a T-Peel Adhesion of at least about 4.6 lb./in. following aging of said substrates for 7 days at 56.5° C.

23. A laminar structure comprising:
(I) a first polycarbonate substrate;
(II) a second polycarbonate substrate; and
(III) a hot melt adhesive comprising:
  (a) about 38 weight percent of an ethylene/vinyl acetate copolymer having a melt index of about 38 to about 48g/10 min as measured by ASTM D-1238, and a vinyl acetate content of about 27.2 to about 28.8 weight percent;
  (b) about 32 weight percent of a tackifying constituent;
  (c) about 15 weight percent of a wax constituent; and
  (d) about 15 weight percent of a low molecular weight ethylene/carbon monoxide constituent with a Brookfield viscosity, measured at 140° C., of about 165 to about 385 centipoises, and a carbon monoxide content of about 1.4 to about 11 weight percent,
wherein said first polycarbonate substrate (I) and said second polycarbonate substrate (II) are joined by an intermediate layer of said hot melt adhesive (III) in interfacial contact therewith and said hot melt adhesive (III) has an initial T-Peel Adhesion to said first polycarbonate substrate (I) and said second polycarbonate substrate (II), measured according to ASTM D-1876, of at least about 5.3 lb./in. and a T-Peel Adhesion of at least about 4.7 lb./in. following aging of said substrates for 7 days at 56.5° C.

24. The laminar structure of claim 23 wherein said hot melt adhesive (III) has an initial T-Peel Adhesion to said first polycarbonate substrate (I) and said second polycarbonate substrate (II), measured according to ASTM D-1876, of at least about 5.7 lb./in. and a T-Peel Adhesion of at least about 5.1 lb./in. following aging of said substrate for 7 days at 56.5° C.

25. The laminar structure of claim 23 wherein said hot melt adhesive (III) has an initial T-Peel Adhesion to said first polycarbonate substrate (I) and said second polycarbonate substrate (II), measured according to ASTM D-1876, of at least about 6 lb./in. and a T-Peel Adhesion of at least about 6 lb./in. following aging of said substrate for 7 days at 56.5° C.

26. The laminar structure of claim 23 wherein said hot melt adhesive (III) has an initial T-Peel Adhesion to said first polycarbonate substrate (I) and said second polycarbonate substrate (II), measured according to ASTM D-1876, of at least about 6.3 lb./in. and a T-Peel Adhesion of at least about 6.2 lb./in. following aging of said substrate for 7 days at 56.5° C.

27. A laminar structure comprising:
(I) a first aluminum foil substrate;
(II) a second aluminum foil substrate; and
(III) a hot melt adhesive comprising:
  (a) about 38 weight percent of an ethylene/vinyl acetate copolymer having a melt index of about 38 to about 48g/10 min as measured by ASTM D-1238 , and a vinyl acetate content of about 27.2 to about 28.8 weight percent;
  (b) about 32 weight percent of a tackifying constituent;
  (c) about 25 weight percent of a wax constituent; and
  (d) about 5 weight percent of a low molecular weight ethylene/carbon monoxide constituent with a Brookfield viscosity, measured at 140° C., of about 165 to about 385 centipoises, and a carbon monoxide content of about 1.4 to about 4.5 weight percent,
wherein said first aluminum foil substrate (I) and said second aluminum foil substrate (II) are joined by an intermediate layer of said hot melt adhesive (III) in interfacial contact therewith and said hot melt adhesive (III) has an initial T-Peel Adhesion to said first aluminum foil substrate (I) and said second aluminum foil substrate (II), measured according to ASTM D-1876, of at least about 2.5 lb./in. and a T-Peel Adhesion of at least about 1.9 lb./in. following aging of said substrates for 7 days at 56.5° C.

28. The laminar structure of claim 27 wherein said hot melt adhesive (III) has an initial T-Peel Adhesion to said first aluminum foil substrate (I) and said second aluminum foil substrate (II), measured according to ASTM D-1876, of at least about 2.7 lb./in. and a T-Peel Adhesion of at least about 2.3 lb./in. following aging of said substrates for 7 days at 56.5° C.

29. The laminar structure of claim 27 wherein said hot melt adhesive (III) has an initial T-Peel Adhesion to said first aluminum foil substrate (I) and said second aluminum foil substrate (II), measured according to ASTM D-1876, of at least about 3.0 lb./in. and a T-Peel Adhesion of at least about 2.3 lb./in. following aging of said substrates for 7 days at 56.5° C.

30. A laminar structure comprising:
(I) a first polyvinyl chloride substrate;
(II) a second polyvinyl chloride substrate; and
(III) a hot melt adhesive comprising:
  (a) about 43 weight percent of an ethylene/vinyl acetate copolymer having a melt index of about 365 to about 440g/10 min as measured by ASTM D-1238 , and a vinyl acetate content of about 27.2 to about 28.8 weight percent;
  (b) about 32 weight percent of a tackifying constituent; and
  (c) about 25 weight percent of a low molecular weight ethylene/carbon monoxide constituent with a Brookfield viscosity, measured at 140° C., of about 230 centipoises, and a carbon monoxide content of about 13.7 weight percent, wherein said first polyvinyl chloride substrate (I) and said second polyvinyl chloride substrate (II) are joined by an intermediate layer of said hot melt adhesive (III) in interfacial contact therewith and said hot melt adhesive (III) has an initial T-Peel Adhesion to said first polyvinyl chloride substrate (I) and said second polyvinyl chloride substrate (II), measured according to ASTM D-1876, of at least about 2.5 lb./in. and a T-Peel Adhesion of at least about 0.06 lb./in. following aging of said substrates for 7 days at 56.5° C.

31. A laminar structure comprising:
(I) a first polyvinyl chloride substrate;
(II) a second polyvinyl chloride substrate; and
(III) a hot melt adhesive comprising:
  (a) about 43 weight percent of an ethylene/vinyl acetate copolymer having a melt index of about 365 to about 440g/10 min as measured by ASTM D-1238 , and a vinyl acetate content of about 27.2 to about 28.8 weight percent;
  (b) about 32 weight percent of a tackifying constituent; and
  (c) about 25 weight percent of a low molecular weight ethylene/vinyl alcohol copolymer constituent with a Brookfield viscosity, measured at 140° C., of about 725 centipoises, and a number average molecular weight, measured by vapor phase osmometry, of about 2400, wherein said first polyvinyl chloride substrate (I) and said second polyvinyl chloride substrate (II) are joined by an intermediate layer of said hot melt adhesive (III) in interfacial contact therewith and said hot melt adhesive (III) has an initial T-Peel Adhesion to said first polyvinyl chloride substrate (I) and said second polyvinyl chloride substrate (II), measured according to ASTM D-1876, of at least about 3.0 lb./in. and and a T-Peel Adhesion of at least about 0.06 lb./in. following aging of said substrates for 7 days at 56.5° C.

* * * * *